United States Patent

Lin

[11] Patent Number: 5,905,720
[45] Date of Patent: May 18, 1999

[54] METHOD AND APPARATUS FOR TRAFFIC MANAGEMENT OF INBOUND COMMUNICATIONS IN A RADIO COMMUNICATION SYSTEM

[75] Inventor: Jyh-Han Lin, Fort Worth, Tex.

[73] Assignee: Motorola, Inc., Schaumburg, Ill.

[21] Appl. No.: 08/747,081

[22] Filed: Nov. 13, 1996

[51] Int. Cl.$^6$ .................................................. H04B 7/212
[52] U.S. Cl. .......................................... 370/337; 370/347
[58] Field of Search .................................. 370/337, 346, 370/347, 348, 321, 322, 461, 447, 449

[56] References Cited

U.S. PATENT DOCUMENTS 5,384,777  1/1995  Ahmadi .................................. 370/337
5,644,576  7/1997  Bauchot et al. .

*Primary Examiner*—Jeffery A. Hofsass
*Assistant Examiner*—Mitchell Slavitt
*Attorney, Agent, or Firm*—R. Louis Breeden

[57] ABSTRACT

A communication system (100) provides inbound communications from messaging units (120) to a controller (105) and outbound communications from the controller (105) to the messaging units (120). The inbound communications include scheduled packets and unscheduled packets that are transmitted over a reverse channel signal 250 divided into time slots. The controller (105) receives the scheduled and unscheduled packets and provides boundary information to the messaging units (120) to allocate the time slots between the scheduled packets and the unscheduled packets. The boundary information is computed based on previous boundary information for a time period and an average throughput of the unscheduled packets for the time period.

23 Claims, 6 Drawing Sheets

METHOD AND APPARATUS FOR TRAFFIC MANAGEMENT OF INBOUND COMMUNICATIONS IN A RADIO COMMUNICATION SYSTEM

FIELD OF THE INVENTION

This invention relates in general to two-way messaging, and more specifically to traffic management of inbound communications.

BACKGROUND OF THE INVENTION

A conventional two-way radio communication system, such as a paging system, typically has an infrastructure including a plurality of outbound transmitters coupled to a radio frequency controller for encoding, batching, and scheduling the transmission of messages to be sent over the air to portable messaging units (PMUs) via an outbound, or forward, communication channel. The PMUs transmit inbound messages over an inbound, or reverse, communication channel. The inbound messages, often referred to as packets, are received by at least one of a plurality of base receivers that are also part of the infrastructure and that are coupled to the controller.

According to some two-way protocols, such as Motorola's ReFLEX™ and InFLEXion™ protocols, some inbound communications, e.g., message acknowledgments, can be scheduled by the controller. Other inbound communications, e.g., PMU registration in a new area, are unscheduled. The unscheduled, or slotted, inbound communications are referred to as ALOHAs and generally comprise transmissions initiated by the PMUs. The reverse channel is divided into time slots allocated between scheduled communications and ALOHAs. The boundary between the scheduled communications and the ALOHAs can be difficult to estimate, however, because ALOHA throughput is very sensitive to parameters such as the number of base receivers, the distribution of base receivers, the traffic load, and the distribution of PMUs.

Thus, what is needed is a method and apparatus for better managing traffic on an inbound communication channel in a two-way radio communication system.

DESCRIPTION OF A PREFERRED EMBODIMENT

Figure 1:
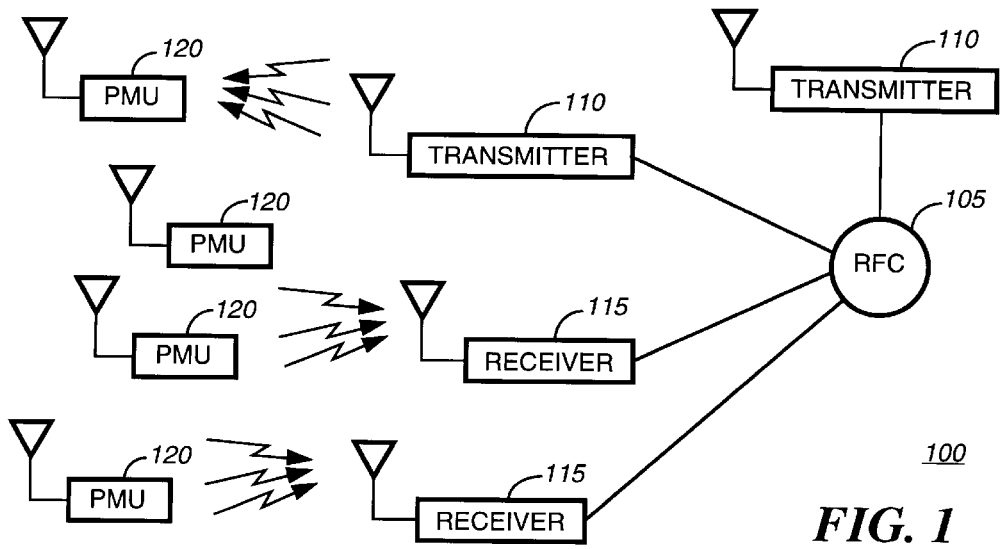
FIG. 1 is a block diagram of a communication system for managing inbound communications according to the present invention.

FIG. 1 shows a radio communication system 100 including a radio frequency controller (RFC) 105 for coordinating transmission of communications within the system 100 in accordance with a signalling protocol, such as Motorola's ReFLEX™ or InFLEXion™ protocol. Outbound communications, generally comprising messages for reception by portable messaging units (PMUs) 120, are provided by the RFC 105 to transmitters 110 for transmission over a forward communication channel. Inbound communications, or packets, are transmitted by the PMUs 120 over a reverse communication channel. The packets are received by one or more receivers 115 and forwarded to the RFC 105 for processing thereby.

Inbound packets include scheduled communications, such as message acknowledgments, that are scheduled by the RFC 105. Other inbound packets, e.g., PMU 120 registration in a new area, are unscheduled communications that comprise slotted ALOHAs. The slotted packets, i.e., ALOHAs, generally comprise transmissions initiated by the PMUs 120. The reverse channel is divided into time slots allocated between scheduled communications and ALOHAs. According to the FLEX™ family of protocols, the communication channels are divided into cycles of one-hundred-twenty-eight (128) frames, each including a predetermined synchronization pattern (sync) and a plurality of blocks of information. The scheduled communications include communications that are assigned to a particular time slot of a particular frame. The boundary between scheduled packets and ALOHAs within a particular frame of the radio signal is generally indicated to PMUs 120 by transmitting boundary information in a preceding frame in a conventional manner.

However, in prior art systems and controllers, the boundary between the scheduled communications and the ALOHAs is difficult to estimate because ALOHA throughput is very sensitive to parameters such as the number of base receivers, the distribution of base receivers, the traffic load, and the distribution of PMUs. The RFC 105 according to the present invention advantageously determines a boundary between scheduled packets and ALOHAs by taking these factors into consideration, thereby more efficiently allocating resources with respect to the reverse communication channel.

Figure 2:
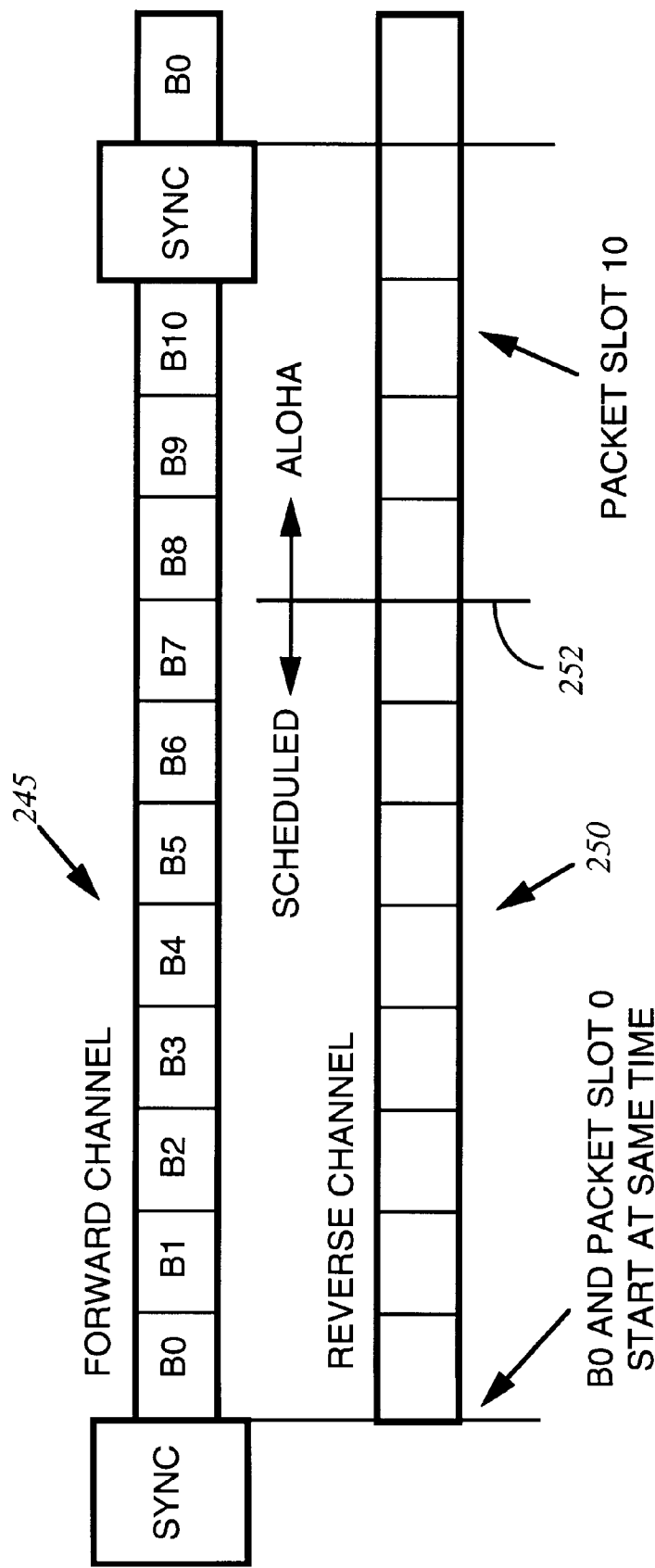
FIG. 2 illustrates forward and reverse channel structures of signals transmitted in the communication system of FIG. I according to the present invention.

FIG. 2 is a signal diagram illustrating the structures of the forward and reverse communication channels. As shown, the signal 245 transmitted over the forward communication channel includes frames comprising a sync word followed by blocks of information that include block information words for transmitting system instructions, such as boundary information for a subsequent frame. At least some of the frames of the signal 250 transmitted over the reverse channel are divided into time slots during which inbound packets are transmitted by the PMUs 120. A boundary 252, specified by previously transmitted boundary information, indicates a division of the time slots into time slots allocated for scheduled communications, i.e., "scheduled packet time slots", and time slots allocated for ALOHAs, i.e., "ALOHA time slots".

Figure 3:
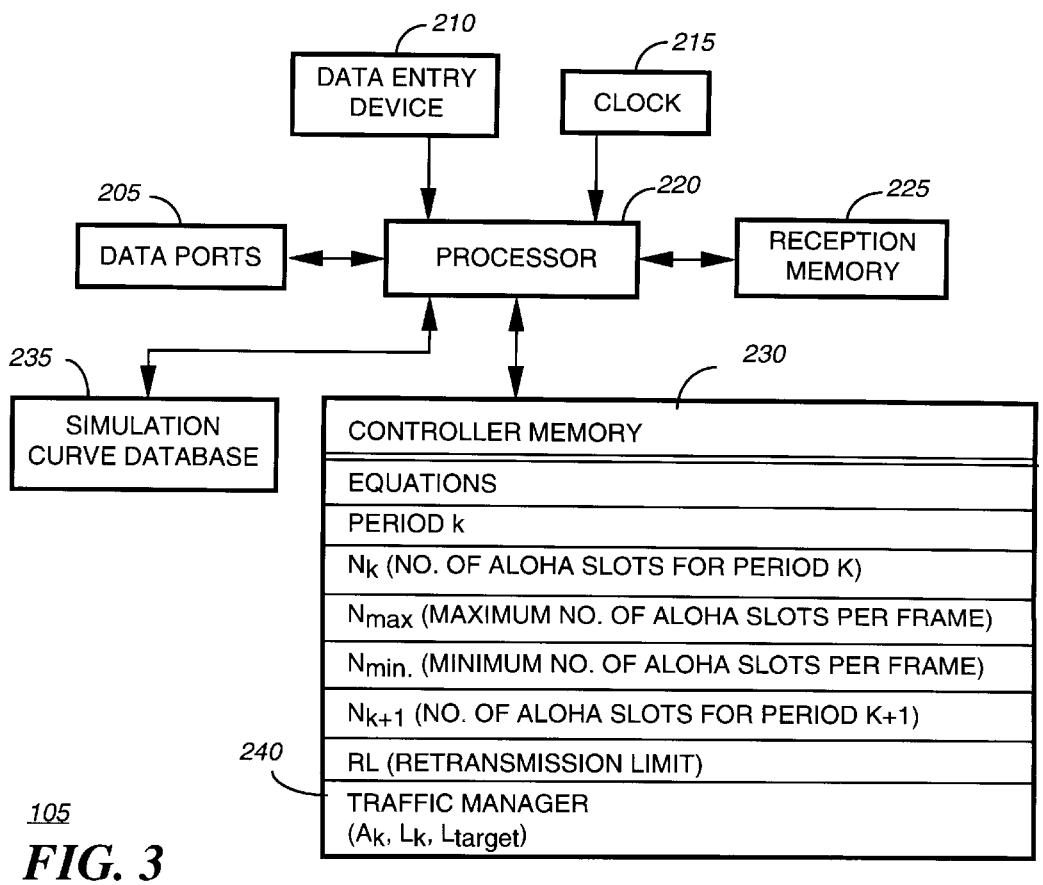
FIG. 3 is an electrical block diagram of a radio frequency controller included in the communication system of FIG. 1 according to the present invention.

FIG. 3 is an electrical block diagram of the RFC 105, which includes data ports 205 for communicating with the transmitters 110 (FIG. 1) and receivers 115 and for receiving message information for transmission to the PMUs 120. The data ports 205 can include, for instance, radio receivers, radio transmitters, modems, or dedicated ports for linking to other types of communication devices. A data entry device 210 receives system information, e.g., subscriber data, and can also receive message information. The RFC 105 further includes a processor 220 for controlling operations of the RFC 105. Coupled thereto is a clock 215 for providing time values and a reception memory 225 for storing packet information provided by the PMUs 120.

According to the present invention, the RFC 105 also has a controller memory 230 for storing parameters and operational information used in operating the RFC 105. Such information can include, for instance, equations and programmed information used in calculating reverse channel boundaries between slotted packets, i.e., ALOHAs, and scheduled packets. Specifically, the controller memory 230 preferably stores a value (k) indicative of a time period comprising a particular number of frames, the characteristics of which are examined to set a boundary for a subsequent frame or frames. The controller memory 230 also stores the number ($N_k$) of ALOHA slots allocated for frames during the current period k, the maximum number ($N_{max}$) of ALOHA slots that can be allocated per frame, the minimum number ($N_{min}$) of ALOHA slots that can be allocated per frame, the number ($N_{k+1}$) of ALOHA slots to be allocated during frames in a subsequent time period, and a retransmission limit value (RL) indicative of an acceptable number of ALOHA retransmissions by the PMUs 120. Retransmissions of ALOHAs could occur, for instance, when a relatively large number of inbound communications result in collisions that prevent reception of packets by the receivers 115, so a limit on the number of retransmissions that are acceptable is desirable.

A traffic manager 240 is included in the RFC 105 for determining the appropriate boundaries between scheduled packets and ALOHAs. During calculation of the boundaries, the traffic manager 240 generates variables such as an average throughput ($A_k$) of inbound packets per slot during the period k, an estimated traffic load ($L_k$) that is measured in packets per slot, and a target traffic load ($L_{target}$) that is measured in packets per slot. The traffic manager 240 can be implemented in firmware stored in the controller memory 230 and executed by the processor 220 or in hardware capable of performing equivalent operations. The period k specifies a number, e.g., three, of frames after which the boundary between types of packets is recalculated, and the numbers $N_{max}$ and $N_{min}$ can represent percentages of the number of slots available in each frame. For instance, when the data rate is 9,600 bits per second (bps), twelve (12) slots may be available. $N_{max}$ could be set to four (4), or 30% of the total number of slots, while $N_{min}$ could be set to one (1), or 8.33% of the total number of slots. The number RL of acceptable ALOHA retransmissions within the system 100 preferably varies with the number of system receivers 115 and is determined based on the desired quality of service, i.e., latency and battery life. When twenty-one (21) receivers 115 are included, for example, RL could be set to two (2). As will be described in greater detail below, RL is used by the RFC 105 to determine a target traffic load for ALOHAs.

The variable $A_k$ is determined by referencing the reception memory 225 to determine the number of packets received in each slot included in the period k, then averaging the number of packets per slot. Other variables, such as $L_{target}$ and $L_k$, used in calculating the boundary information are determined by referencing simulated curves stored in a simulation curve database 235 included in the RFC 105. Preferably, conventional software and simulation techniques are used to generate data indicative of average throughputs for different traffic loads and data indicative of traffic loads for numbers of inbound retransmissions.

Figure 4:
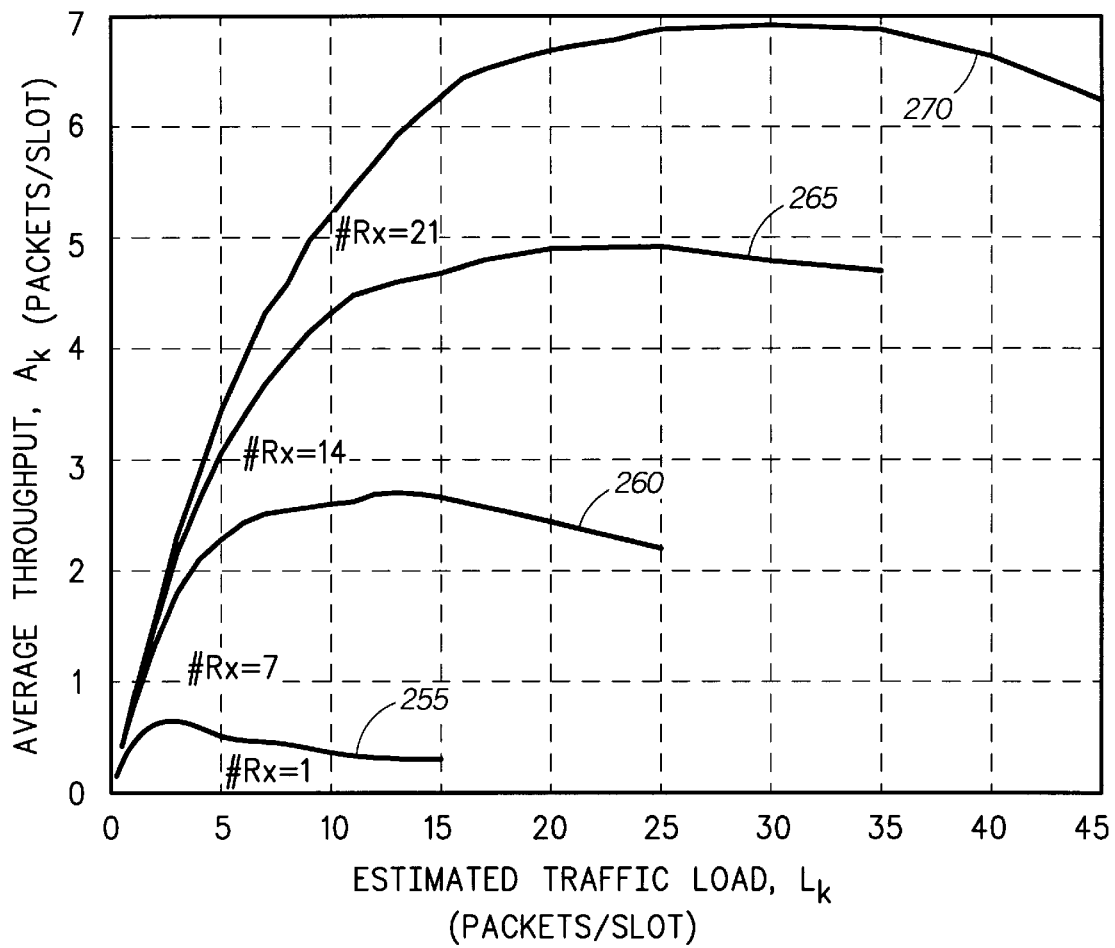
FIG. 4 is a diagram illustrating simulated curves for throughput of inbound communications in the communication system of FIG. 1 according to the present invention.
Figure 5:
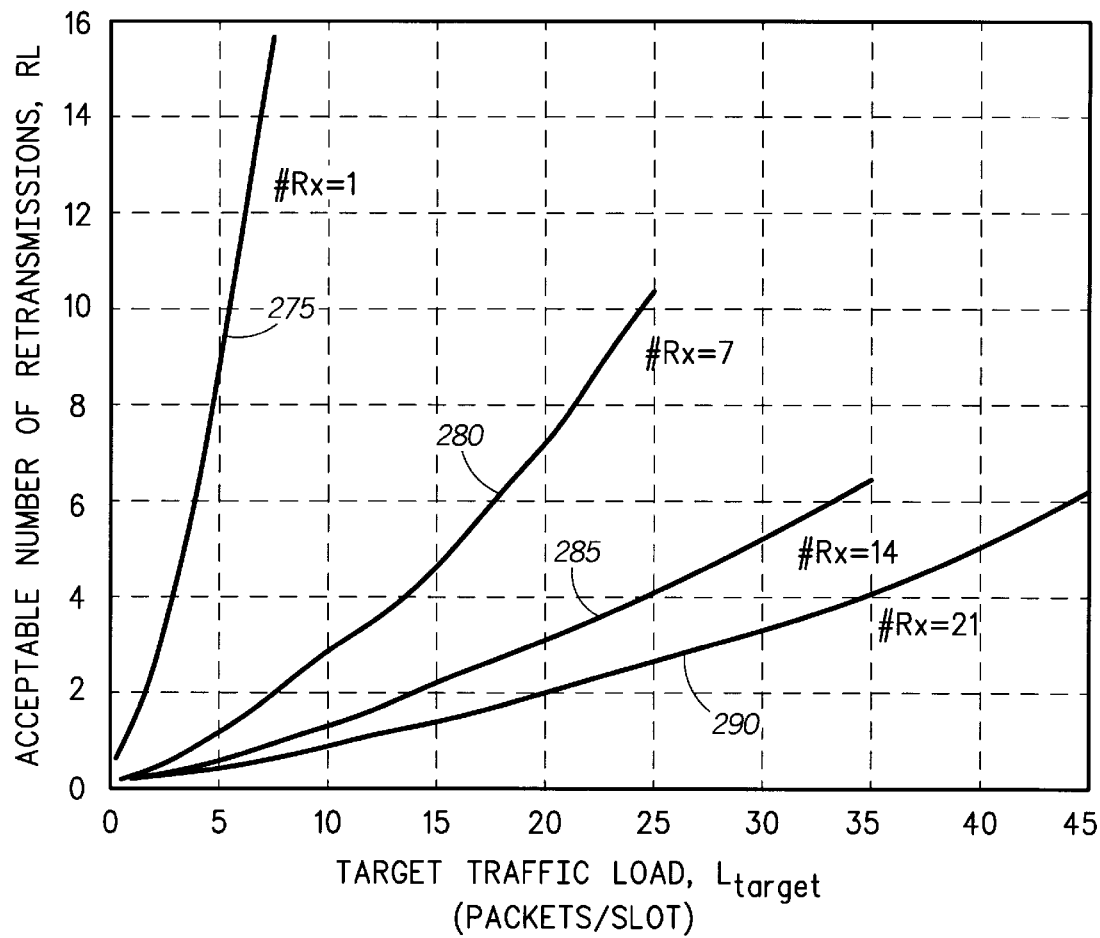
FIG. 5 is a diagram illustrating simulated curves for retransmission of inbound communications in the communication system of FIG. 1 according to the present invention.

FIGS. 4 and 5 depict throughput and retransmission curves that are preferably stored in the simulation curve database 235. The throughput curves 255, 260, 265, 270 (FIG. 4) are illustrated for systems including one, seven, fourteen, and twenty-one receivers 115, respectively. By way of example, when the system 100 includes fourteen receivers 115, and the average throughput $A_k$ for a period k equals three, i.e., $A_k=3$, the estimated traffic load $L_k$ given by curve 265 is equal to five, i.e., $L_k=5$. The retransmission curves 275, 280, 285, 290 (FIG. 5) are also illustrated for systems including one, seven, fourteen, and twenty-one receivers 115, respectively. When, for instance, the number of receivers 115 equals twenty-one, and RL=2, the target traffic load $L_{target}$ given by curve 290 is twenty, i.e., $L_{target}=20$. It will be appreciated that different number of receivers 115 could be used to generate different throughput and retransmission curves.

According to the present invention, the number of ALOHA slots per frame is initially set to the maximum number, i.e., $N_1=N_{max}$. At the end of period k, the traffic manager 240 estimates $A_k$ and determines, from the simulation curve database 235, $L_k$ and $L_{target}$. The traffic manager 240 then computes the number of ALOHA slots for one or more subsequent frames using the following equations:

$$p = \text{ceiling}\left(\frac{N_k \times L_k}{L_{target}}\right), \text{ and} \qquad (1)$$

$$N_{k+1} = \max\{p, N_{min}\}, \qquad (2)$$

where "ceiling" is a rounding operation that rounds a given number to a closest, greater integer. For instance, ceiling (2.5)=3. Once p is calculated, $N_{k+1}$ is calculated to be the greater of p and $N_{min}$.

In this manner, the traffic manager 240 references programmed simulation curves as well as a number of factors, including previous ALOHA slot allocation, the number of receivers 115 in the system 100, the average inbound throughput for a particular number of frames, the maximum and minimum ALOHA allocations, and the acceptable number of ALOHA retransmissions, in order to compute an ALOHA slot allocation for a subsequent frame. Therefore, the slots for ALOHAs can be allocated to better anticipate system needs. As a result, system resources with respect to the reverse communication channel are more efficiently used to minimize system delays and errors in inbound communications.

Figure 6:
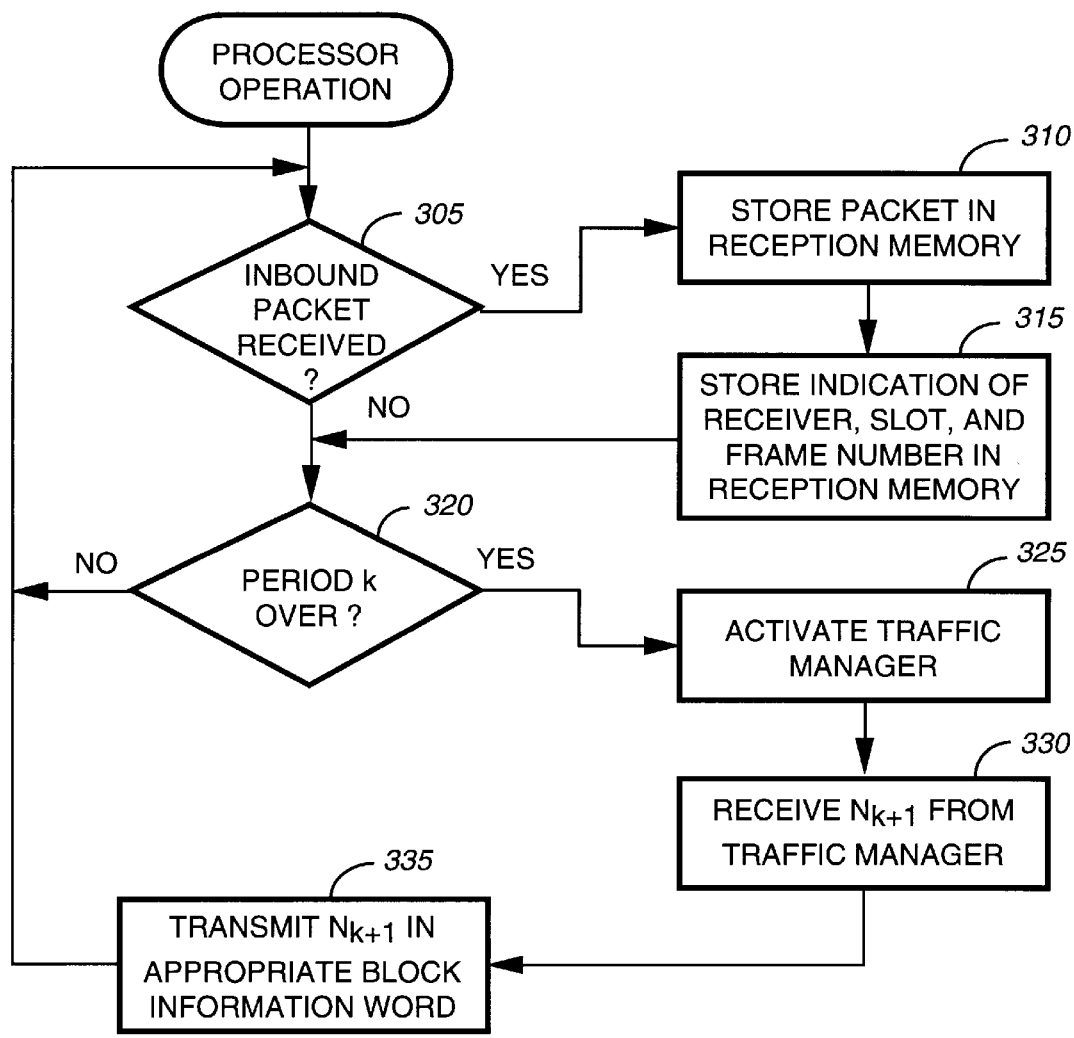
FIG. 6 is a flowchart of an operation performed by a processor included in the radio frequency controller of FIG. 3 according to the present invention.

Referring next to FIG. 6, a flowchart illustrates an operation of the processor 220 included in the RFC 105. When, at step 305, an inbound packet is received via the data ports 205, the packet is stored, at step 310, in the reception memory 225. Additionally, information indicative of the forwarding receiver 115 and the slot and frame number in which the packet was received are stored, at step 315. When, at step 320, the period k is over, the traffic manager 240 is activated, at step 325. Next, the ALOHA slot allocation for future frames, $N_{k+1}$, is received from the traffic manager 240, at step 330. Boundary information indicative of the ALOHA slot allocation for a subsequent frame is then processed, at step 335, for transmission by the transmitters 110 in an appropriate block information word of the radio signal provided to the PMUs 120.

Figure 7:
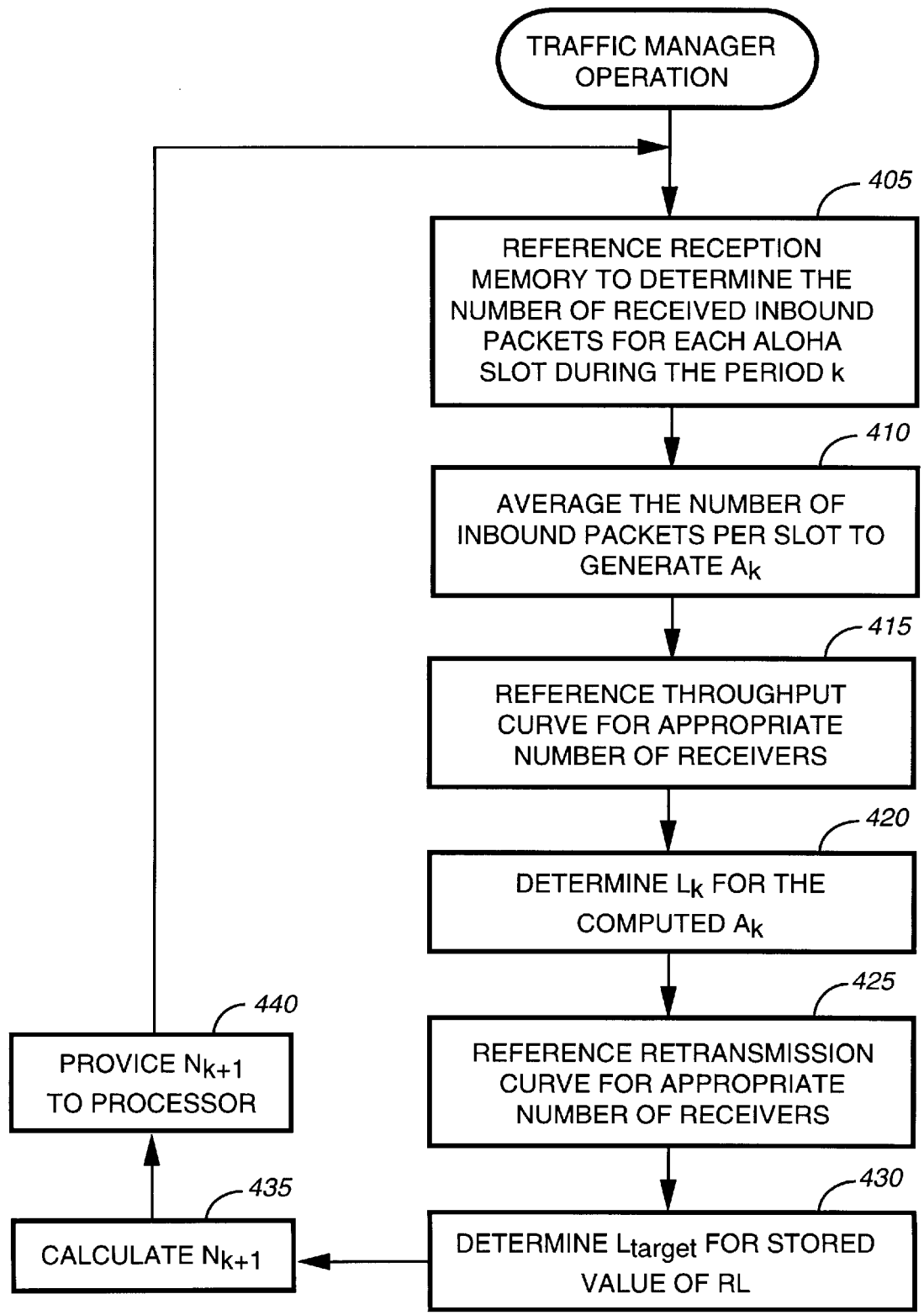
FIG. 7 is a flowchart of an operation of a traffic manager included in the radio frequency controller of FIG. 3 according to the present invention.

FIG. 7 is a flowchart of an operation of the traffic manager 240 according to the present invention. The traffic manager 240, at step 405, references the reception memory 225 to determine the number of inbound ALOHAs received during the period k. Based on the information stored in the reception memory 225, the traffic manager 240 can determine which stored inbound communications are ALOHAs and can also remove duplicate ALOHAs, i.e., ALOHAs received by more than one receiver 115, from consideration. For instance, when two or more receivers 115 have forwarded the same ALOHA to the RFC 105, only one is considered by the traffic manager 240. Then, at step 410, the traffic manager 240 averages the number of inbound packets per slot for period k to generate $A_k$. At step 415, the throughput curve (FIG. 4) for the appropriate number of receivers 115 is referenced to determine, at step 420, the value of $L_k$ that corresponds to the computed value of $A_k$. Additionally, at step 425, the retransmission curve (FIG. 5) for the appropriate number of receivers 115 is referenced to determine, at step 430, the value of $L_{target}$ that corresponds to the stored value of RL. The traffic manager 240 next, at step 435, uses the equations set forth above to calculate $N_{k+1}$, which is provided to the processor 220, at step 440.

In summary, the radio communication system as described above includes portable subscriber units, or messaging units, that transmit inbound communications of two types, i.e., scheduled packets and unscheduled, slotted packets referred to as ALOHAs. The boundary between scheduled packets and ALOHAs within the frames of the inbound channel is, according to the present invention, varied to maximize the number of packets that can be scheduled by a controller receiving the packets. This is preferably done by programming the controller with minimum and maximum ALOHA slot allocations per frame, a value indicative of a limit of an acceptable number of ALOHA retransmissions, and a value indicative of a period including a particular number of frames. Additionally, for various numbers of system receivers, simulated curves are stored to depict a relationship between average ALOHA throughput and estimated traffic load on the reverse channel and a relationship between acceptable numbers of ALOHA retransmissions and target traffic load on the reverse channel.

At start up, the maximum number of ALOHA slots is allocated for ALOHA transmissions. Then, after the programmed period is over, the boundary between ALOHA slots and scheduled slots is computed by referencing the simulated curves and a number of other factors, including average ALOHA throughput, retransmission limits, number of system receivers, maximum and minimum ALOHA slot allocations per frame, and the number of previously allocated ALOHA slots. Because such a large number of factors are considered, the ALOHA slot allocations calculated according to the present invention better anticipate system needs. As a result, system resources with respect to the reverse communication channel are more efficiently used to minimize system delays in inbound communications.

It will be appreciated by now that there has been provided a method and apparatus for better managing traffic on an inbound communication channel in a two-way radio communication system.

What is claimed is:

1. A communication system for traffic management of inbound communications, the communication system comprising:

messaging units that transmit scheduled packets and unscheduled packets over a reverse channel divided into time slots; and a controller that receives the scheduled and unscheduled packets and that provides boundary information to the messaging units to allocate the time slots between the scheduled packets and the unscheduled packets, the controller comprising a simulation curve database for computing the boundary information, wherein the controller is arranged to compute the boundary information based on previous boundary information for a time period, and further based on values determined from the simulation curve database as a function of an average throughput of the unscheduled packets for the time period, and a stored retransmission limit.

2. The communication system of claim 1, wherein the reverse channel includes frames, at least some of which are divided into the time slots.

3. The communication system of claim 1, wherein the boundary information is provided to the messaging units in a block information word that is included in a frame of a radio signal transmitted to the messaging units.

4. The communication system of claim 1, wherein:

the unscheduled packets comprise communications initiated by the messaging units; and the scheduled packets comprise communications assigned to a particular time slot of a particular frame by the controller.

5. The communication system of claim 1, further comprising:

receivers that receive the scheduled and unscheduled packets from the messaging units and forward the scheduled and unscheduled packets to the controller.

6. The communication system of claim 1, wherein the controller comprises:

a reception memory in which packet information for the time period is stored, the packet information including information indicative of the unscheduled packets received during the time period and the time slots in which the unscheduled packets were received.

7. The communication system of claim 6, wherein the controller further comprises:

a traffic manager coupled to the reception memory for computing the boundary information based on the information stored in the reception memory.

8. The communication system of claim 7, further comprising:

transmitters coupled to the controller to transmit a radio signal including the boundary information.

9. The communication system of claim 1, wherein the simulation curve database comprises:

throughput curves depicting a relationship between average throughputs of unscheduled packets and estimated traffic loads of unscheduled packets and retransmission curves depicting a relationship between acceptable numbers of retransmissions of unscheduled packets and target traffic loads of unscheduled packets.

10. The communication system of claim 9, wherein the boundary information ($N_{k+1}$) for a subsequent time period is determined using equations as follows:

$$p = \text{ceiling}\left(\frac{N_k \times L_k}{L_{target}}\right) \quad \text{(a)}$$

and (b) $N_{k+1} = \max\{p, N_{min}\}$, where $N_k$ represents the previous boundary information, $L_k$ represents an estimated traffic load, $L_{target}$ represents a target traffic load, and $N_{min}$ represents a minimum number of time slots allocated for unscheduled packets.

11. A controller for receiving inbound communications comprising scheduled packets and unscheduled packets transmitted by messaging units over a reverse channel divided into time slots, the controller comprising:

a data port that receives the unscheduled packets for a time period;

a traffic manager coupled to the data port for programming the controller to compute boundary information to allocate the time slots between the scheduled packets and the unscheduled packets; and a simulation curve database for computing the boundary information, wherein the traffic manager programs the controller to compute the boundary information based on previous boundary information for the time period, and further based on values determined from the simulation curve database as a function of an average throughput of the unscheduled packets for the time period, and a stored retransmission limit, and wherein the boundary information is provided to the data port for subsequent transmission in a radio signal provided to the messaging units.

12. The controller of claim 11, wherein the reverse channel includes frames, at least some of which are divided into the time slots.

13. The controller of claim 11, wherein the controller is included within a communication system also comprising the messaging units, receivers for receiving the scheduled and unscheduled packets and forwarding them to the controller, and transmitters for transmitting the radio signal to the messaging units.

14. The controller of claim 11, wherein:

the unscheduled packets comprise communications initiated by the messaging units; and the scheduled packets comprise communications assigned to a particular time slot of a particular frame by the controller.

15. The controller of claim 11, further comprising:

a reception memory in which packet information for the time period is stored, the packet information including information indicative of the unscheduled packets received during the time period and the time slots in which the unscheduled packets were received.

16. The controller of claim 15, wherein the simulation curve database comprises throughput curves depicting a relationship between average throughputs of unscheduled packets and estimated traffic loads of unscheduled packets and retransmission curves depicting a relationship between acceptable numbers of retransmissions of unscheduled packets and target traffic loads of unscheduled packets.

17. The controller of claim 16, wherein the boundary information ($N_{k+1}$) for a subsequent time period is determined using equations as follows:

$$p = \text{ceiling}\left(\frac{N_k \times L_k}{L_{target}}\right) \quad \text{(a)}$$

and (b) $N_{k+1} = \max\{p, N_{min}\}$, where $N_k$ represents the previous boundary information, $L_k$ represents an estimated traffic load, $L_{target}$ represents a target traffic load, and $N_{min}$ represents a minimum number of time slots allocated for unscheduled packets.

18. A method for traffic management of inbound communications in a communication system comprising a controller for receiving packets and messaging units for transmitting scheduled packets and unscheduled packets over a reverse channel divided into time slots, the method comprising the steps of:

receiving the unscheduled packets for a time period;

computing, after the time period is over, boundary information specifying an allocation of the time slots between the scheduled and unscheduled packets, wherein the boundary information is computed based on previous boundary information, and further based on values determined from a simulation curve database as a function of an average throughput of the unscheduled packets for the time period, and a stored retransmission limit; and transmitting the boundary information to the messaging units for use during a subsequent time period.

19. The method of claim 18, further comprising, prior to the computing step, the step of:

storing packet information for the time period in a reception memory, the packet information comprising information indicative of the unscheduled packets received during the time period and the time slots during which the unscheduled packets were received.

20. The method of claim 19, wherein the computing step comprises the step of:

computing the boundary information based on the information stored in the reception memory.

21. The method of claim 19, further comprising, prior to the computing step, the step of:

storing the simulation curve database, comprising throughput curves depicting a relationship between average throughputs of unscheduled packets and estimated traffic loads of unscheduled packets and retransmission curves depicting a relationship between acceptable numbers of retransmissions of unscheduled packets and target traffic loads of unscheduled packets.

22. The method of claim 21, wherein the computing step comprises the step of determining the boundary information ($N_{k+1}$) for a subsequent time period by solving equations as follows:

$$p = \text{ceiling}\left(\frac{N_k \times L_k}{L_{target}}\right) \quad \text{(a)}$$

and (b) $N_{k+1} = \max\{p, N_{min}\}$, where $N_k$ represents the previous boundary information, $L_k$ represents an estimated traffic load, $L_{target}$ represents a target traffic load, and $N_{min}$ represents a minimum number of time slots allocated for unscheduled packets.

23. The method of claim 22, wherein the solving step comprises the steps of:

selecting one of the throughput curves based on a number of system receivers;

determining the estimated traffic load corresponding to the average throughput located on the one of the throughput curves;

selecting one of the retransmission curves based on the number of system receivers; and determining the target traffic load corresponding to an acceptable number of retransmissions of unscheduled packets located on the retransmission curve.

\* \* \* \* \*